(12) United States Patent
Roos et al.

(10) Patent No.: US 12,455,176 B2
(45) Date of Patent: Oct. 28, 2025

(54) DEVICE AND SYSTEM FOR DETERMINING A POSITION OF A MAGNETIC SOURCE, OR AN ORIENTATION OF A UNIFORM MAGNETIC FIELD

(71) Applicant: Maglab AG, Basel (CH)

(72) Inventors: Markus Roos, Baar (CH); Javier Bilbao, Mannedorf (CH)

(73) Assignee: MAGLAB AG, Basel (CH)

( * ) Notice: Subject to any disclaimer, the term of this patent is extended or adjusted under 35 U.S.C. 154(b) by 227 days.

(21) Appl. No.: 18/310,060

(22) Filed: May 1, 2023

(65) Prior Publication Data
US 2024/0118110 A1    Apr. 11, 2024

(30) Foreign Application Priority Data
Oct. 11, 2022   (EP) ...................................... 22200940

(51) Int. Cl.
*G01D 5/14* (2006.01)
*G01D 5/244* (2006.01)

(52) U.S. Cl.
CPC ........... *G01D 5/145* (2013.01); *G01D 5/2448* (2013.01)

(58) Field of Classification Search
CPC .............................. G01D 5/145; G01D 5/2448
See application file for complete search history.

(56) References Cited

U.S. PATENT DOCUMENTS

| | | | |
|---|---|---|---|
| 8,963,540 B2 | 2/2015 | Reymond et al. | |
| 2003/0225539 A1* | 12/2003 | Motz | G01D 5/2449 702/107 |
| 2007/0279044 A1* | 12/2007 | Rossmann | G01R 33/07 324/207.2 |

FOREIGN PATENT DOCUMENTS

| | | |
|---|---|---|
| EP | 3467443 A1 | 4/2019 |
| EP | 3517897 A1 | 7/2019 |
| JP | 2016-003924 A | 1/2016 |
| JP | 2019-128344 A | 8/2019 |
| JP | 2020-143954 A | 9/2020 |
| WO | 2013122702 A1 | 8/2013 |

(Continued)

OTHER PUBLICATIONS

European Search Report for European patent application No. 22200940.9. Mailed Feb. 23, 2023. European Patent Office, Munich, Germany.

(Continued)

*Primary Examiner* — Reena Aurora
(74) *Attorney, Agent, or Firm* — Michael Best & Friedrich LLP

(57) ABSTRACT

A sensor device for determining a position of a magnetic source relative to the sensor device, or for determining an orientation of a uniform magnetic field relative to the sensor device, the sensor device comprising: a substrate comprising a plurality of magnetic sensors configured for providing a plurality of sensor signals; a signal combiner configured for combining the sensor signals into a combined waveform; a processing circuit configured for extracting said position or orientation from the combined waveform; wherein the signal combiner is configured for generating the combined waveform by including one or more portions of the sensor signals during respective predefined time durations, which time durations are determined during a calibration procedure, wherein at least two of said time durations have different values.

17 Claims, 6 Drawing Sheets

(56) References Cited

FOREIGN PATENT DOCUMENTS

| | | |
|---|---|---|
| WO | 2014036664 A1 | 3/2014 |
| WO | 2016028365 A1 | 2/2016 |
| WO | 2016200637 A1 | 12/2016 |
| WO | 2022186560 A1 | 9/2022 |

OTHER PUBLICATIONS

Japanese Patent Office. Notice of Reasons for Refusal for Application No. 2023-145765, dated Oct. 8, 2024 (10 pages with translation).

* cited by examiner

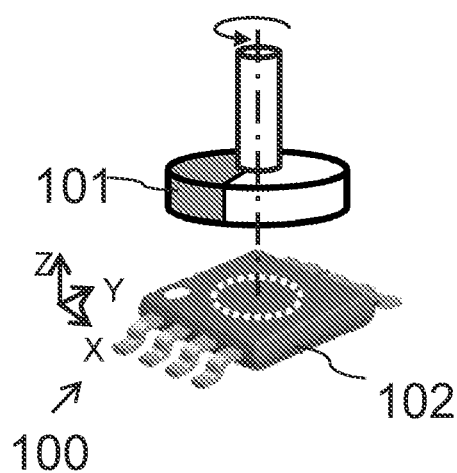
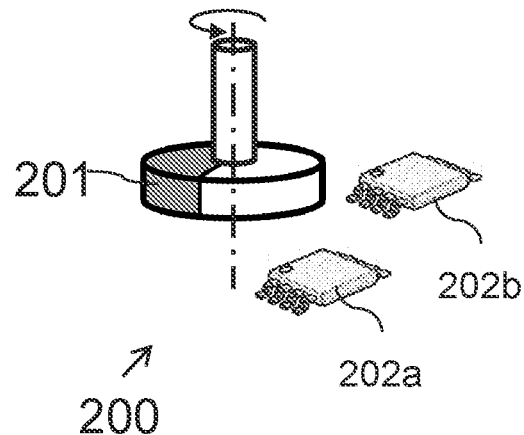
FIG. 1               FIG. 2
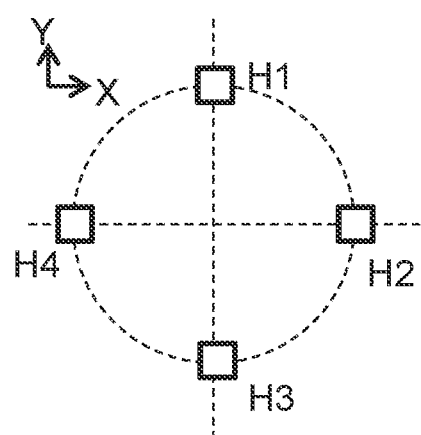
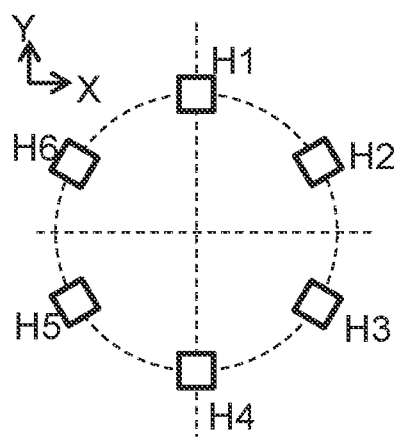
FIG. 3               FIG. 4

DEVICE AND SYSTEM FOR DETERMINING A POSITION OF A MAGNETIC SOURCE, OR AN ORIENTATION OF A UNIFORM MAGNETIC FIELD

TECHNICAL FIELD

The present disclosure relates in general to the field of magnetic sensor systems, and more in particular to magnetic position sensor systems and devices for determining a linear or an angular position of a sensor device relative to a magnetic source, or to a magnetic sensor device for determining an orientation of a substantially uniform magnetic field relative to said magnetic sensor device.

BACKGROUND

Magnetic position sensor systems, in particular linear or angular position sensor systems are known in the art. Many of these systems rely on the measurement of a sine and a cosine signal, and use an arctangent function to calculate an angle.

In practice, however, magnetic sensors are not perfect, and also magnets used in such systems are not perfect. Magnetic sensors may e.g. have an offset, a gain mismatch, a position error, an orientation error. Magnets may e.g. have geometrical deviations, material imperfections, mounting imperfections (e.g. position offset or tilt), and hence the magnetic field generated by such a magnet is not ideal either.

U.S. Pat. No. 8,963,540(B2) describes a Hall-effect based angular orientation sensor and corresponding methods and devices. The sensor device has a plurality of Hall sensors, and a wiring unit W that outputs a staircase signal which approximates a sine wave by concatenating the Hall voltages from the plurality of sensors. The sensor device further includes a band-pass-filter BPF and a phase detection unit.

SUMMARY

It is an object of embodiments of the present disclosure to provide a sensor device capable of determining a position (e.g. a linear or angular position) of a magnetic source that is movable relative to the sensor device, or vice versa, or that is capable of determining an orientation of a substantially uniform magnetic field (e.g. the earth magnetic field, or a magnetic field generated by at least one coil).

It is also an object of embodiments of the present disclosure to provide a sensor system including such a sensor device and a magnetic source, e.g. in the form of a permanent magnet or an elongated structure having a plurality of alternating poles.

It is an object of embodiments of the present disclosure to provide such a sensor device and a sensor system providing a position with improved accuracy, despite imperfections of the sensors and or the magnetic source.

It is an object of embodiments of the present disclosure to provide such a sensor device and a sensor system capable of determining said position or orientation at a relatively high rate, e.g. at a rate of at least 20 kHz, or at least 100 kHz, or at least 500 kHz, or at least 1 MHz, or at least 2 MHz, or at least 4 MHz, or at least 8 MHz.

It is an object of embodiments of the present disclosure to provide an angular position sensor system for measuring an angular position of a magnet rotating at a speed up to 5000 RPM or up to 10000 RPM, with an absolute error smaller than 5°, or smaller than 4°, or smaller than 3°, or smaller than 2°, or smaller than 1°, or smaller than 0.5°, or smaller than 0.3°.

It is an object of embodiments of the present disclosure to provide an angular position sensor device and a system, wherein the device includes a plurality of Hall elements, but wherein the Hall elements are not trimmed (e.g. to correct for sensitivity mismatch, or other sensor imperfections such as offsets, or geometrical imperfections such as non-orthogonality).

It is an object of embodiments of the present disclosure to provide such a sensor device and a sensor system having a reduced sensitivity with respect to an external disturbance field.

These and other objectives are accomplished by embodiments of the present disclosure.

According to a first aspect, the present disclosure provides a sensor device for determining a (e.g. linear or angular) position of a magnetic source that is movable relative to the sensor device, or vice versa, or for determining an orientation of a substantially uniform magnetic field (e.g. the Earth magnetic field), the sensor device comprising: a substrate comprising a plurality of at least two magnetic sensors configured for providing a plurality of at least two sensor signals; a signal combiner configured for combining the sensor signals into a (e.g. a single) combined waveform; a processing circuit configured for extracting said position or orientation from the combined waveform; wherein the signal combiner is configured for generating the combined waveform by including one or more portions of the sensor signals during respective predefined time durations; wherein the predefined time durations are determined during a calibration procedure; and wherein at least two of said predefined time durations have a different value.

The purpose of the calibration procedure is to find a number of time durations that reduces the overall position or orientation error. It is noted that there may be multiple sets of time durations that reduce the overall position or orientation error, see for example the three solution proposed in FIG. 12, and in FIG. 13 and in FIG. 14.

The calibration may be performed at chip level (without a magnetic source), using a constant magnetic field (e.g. generated by coils). These calibration values will typically reduce or eliminate errors related to sensitivity mismatch of the sensors, and non-ideal positioning of the sensor elements.

With "orientation of a substantially uniform magnetic field" is meant for example the orientation of the earth magnetic field in an E-compass application, or the orientation of a magnetic field generated by coils.

The calibration values may be stored in a non-volatile memory (e.g. flash) connected to, or incorporated in the sensor device.

The substrate may be a semiconductor substrate.

The sensor device may be included in a package, also called "chip", although that is not absolutely required.

In an embodiment, the processing circuit comprises a Band-Pass-Filter and a phase detector.

The phase detection may be based on detecting a zero crossing of the band-pass-filtered signal, e.g. using a counter and a comparator, or in other known manners.

In an embodiment, the signal combiner is configured for generating said combined waveform according to a timing scheme having a predefined duration Ts, partitioned in a number of timing windows each having a duration of Ts/N, N being the number of sensors.

The predefined duration Ts is the inverse of a sampling frequency fs, at which the (e.g. linear or angular) position or orientation is provided. The value of fs may be a value in the range from 20 kHz to 20 MHz, or from 50 kHz to 15 MHz, or from 100 kHz to 10 MHz, e.g. equal to about 1.0 MHz or equal to about 16.0 MHz.

The counter of the phase detector may run at a clock frequency fc which is at least a factor 100 faster than the sampling frequency fs.

The signal combiner (e.g. multiplexer or switches) may be operated at a clock frequency which is at least a factor 100 faster than the sampling frequency fs.

Preferably the time durations of the portions (e.g. $\Delta t11$ to $\Delta t44$) are smaller than 90% of the duration of the timing window, or smaller than 80% of the duration of the timing window, or smaller than 70% of the duration of the timing window.

In an embodiment, the signal combiner is configured for including only one portion of a sensor signal in each respective timing window.

An example of this embodiment is illustrated in FIG. 12. For example, the first timing window w1 has a portion of the first sensor signal h1 having a duration $\Delta t11$, the second time window w2 has a portion of the second sensor signal h2 having a duration $\Delta t22$, etc.

Preferably the portions are arranged near the centres of the timing windows (also known as "centrally aligned"), in order to reduce jitter.

This embodiment offers the advantage that its implementation is relatively simple, because no signals need to be added in the timing windows.

In an embodiment, the number of sensors is an even number; the sensors are equidistantly spaced on a virtual circle; and the signal combiner is configured for adding or subtracting portions of two diametrically opposite sensors in each timing window.

An example of this embodiment is illustrated in FIG. 13. For example, suppose that the sensor device has four sensor elements, and that sensor H1 and H3 are located diametrically opposite each other, and that sensors H2 and H4 are located diametrically opposite each other, then the waveform of this embodiment is generated such in the first timing window w1 a portion of the first sensor signal h1 (having a width $\Delta t11$) and a portion of the third sensor signal h3 (having a width $\Delta t13$) are added, and such that in the second time window w2 a portion of the second sensor signal h2 (having a width $\Delta t22$) and a portion of the fourth sensor signal h4 (having a width $\Delta t24$) are added, etc.

Again, preferably all portions are arranged near the centres of the timing windows, in order to reduce jitter.

This embodiment offers the additional advantage that the so determined position or orientation is highly insensitive to an external disturbance field.

In an embodiment, the signal combiner is configured for adding or subtracting only two portions of sensor signals originating from two diametrically opposite sensors, in each timing window.

In an embodiment, the signal combiner is configured for adding or subtracting portions of at least two or at least three or at least four sensor signals in each timing window.

For example, as illustrated in FIG. 14, the first timing window w1 may have a portion of the first sensor signal h1 having a duration $\Delta t11$ and added thereto a portion of the third sensor signal h3 having a duration $\Delta t13$, and added thereto a portion of the second sensor signal h2 having a duration $\Delta t12$, and added thereto a portion of the fourth sensor signal h4 having a duration $\Delta t14$ (not visible in FIG. 14).

Again, preferably all portions are arranged near the centres of the timing windows, in order to reduce jitter.

In an embodiment, the signal combiner is configured for adding or subtracting a portion of each sensor signal in each timing window, each portion having a predefined time duration.

In this embodiment, the number of portions added in each time window is equal to the number of sensors, each over their respective time duration. If the parameters are well chosen, this embodiment will yield the lowest position or orientation error, and thus provide the highest accuracy.

In an embodiment, the time durations of at least two or at least three portions being added or subtracted, have values which are different from each other.

For example, in the example of FIG. 13, at least one of the following statements is true: $\Delta t11 <> \Delta t13$; $\Delta t22 <> \Delta t24$; $\Delta t31 <> \Delta t33$; $\Delta t42 <> \Delta t44$.

In an embodiment, the magnetic source (101) is a permanent magnet which is rotatable about a rotation axis; and the position to be determined is an angular position ($\phi$)).

Preferably the magnetic source is a two-pole permanent magnet, e.g. a two-pole bar magnet, or a two-pole disk magnet, or a two pole ring magnet.

In an embodiment, the magnetic source is an elongated structure having one pole pair, or having a plurality of alternating poles; and the sensor device is movable relative to the magnetic structure at a constant distance (also known as "airgap"); and the position to be determined is an linear position (e.g. x) along the elongated structure.

In an embodiment, the substantially uniform magnetic field is the earth magnetic field, or is a magnetic field generated by at least one coil; and the orientation to be determined is an angle ($\phi$) with respect to a reference orientation.

Such a sensor device may be used in an electronic compass (E-compass).

In an embodiment, some or all sensors are configured to measure a magnetic field (e.g. Bz) in a direction perpendicular to the substrate.

In an embodiment, some or all sensors are configured to measure a magnetic field (e.g. Bx, By, Br, Bt) in a direction parallel to the substrate.

In an embodiment, a first subset of the sensors are configured to measure a magnetic field (e.g. Bz) in a direction perpendicular to the substrate, and a second subset of the sensors are configured to measure a magnetic field in a direction parallel (e.g. Bx, By, Br, Bt) to the substrate.

In an embodiment, some or all sensors are configured to measure a magnetic field (e.g. Br) in a radial direction parallel to the substrate.

In an embodiment, some or all sensors are configured to measure a magnetic field (e.g. Bt) in a circumferential direction parallel to the substrate.

A magnetic field component parallel to the substrate may be noted as Bx (in the X-direction) or By (in the Y-direction), or Br (oriented in a radial direction), or Bt (oriented in a circumferential direction, i.e. tangential to the virtual circle).

In an embodiment, some or all sensors are horizontal Hall elements.

In an embodiment, some or all sensors are vertical Hall elements, having an axis of maximum sensitivity oriented in a circumferential direction, or having an axis of maximum sensitivity oriented in a radial direction.

In an embodiment, some or all sensors are magneto-resistive elements, having an axis of maximum sensitivity oriented in a circumferential direction, or having an axis of maximum sensitivity oriented in a radial direction.

In an embodiment, the sensors are configured to measure a magnetic field in at least two different orientations.

The sensor may for example have four vertical Hall elements, two of the sensors oriented with their axis of maximum sensitivity in the X-direction, the two other sensors oriented with their axis of maximum sensitivity in the Y-direction, wherein X and Y are orthogonal axes parallel to the substrate, e.g. as illustrated in FIG. 7.

As another example, the sensor device may have only two sensors, one vertical Hall element for measuring Bx, and one vertical Hall element for measuring By. (e.g. a variant of FIG. 7 having only V1 and V2).

In an embodiment, the sensor elements are situated on a virtual circle.

In an embodiment, the sensor elements are situated on a virtual circle, and are equidistantly spaced apart.

According to a second aspect, the present disclosure also provides a position sensor system comprising: a sensor device according to the first aspect, and said magnetic source.

In an embodiment, the predefined time durations (e.g. $\Delta t11$ to $\Delta t44$) are determined during a calibration procedure which is performed using a test-setup comprising the sensor device and the magnetic source.

These calibration values will typically not only reduce errors related to sensitivity mismatch of the sensors, but also correct for non-idealities of the magnetic source.

The disclosed embodiments are defined by the independent claims. The dependent claims define advantageous embodiments.

These and other features and advantages of the various disclosed embodiments will be apparent from the following description of non-limiting embodiments of the present disclosure which will be elucidated below with reference to the drawing.

BRIEF DESCRIPTION OF THE DRAWINGS

FIG. 1 is a schematic representation of an angular position sensor system comprising a permanent magnet and a sensor device. The magnet is rotatable about a rotation axis. The sensor device is arranged "on axis".

FIG. 2 is a schematic representation of an angular position sensor system comprising a permanent magnet and a sensor device. The magnet is rotatable about a rotation axis. The sensor device is arranged "off axis", e.g. next to the magnet, or under the magnet.

FIG. 3 shows a substrate with four Horizontal Hall elements arranged on a virtual circle, spaced apart by multiples of 90°, as may be used in embodiments of the present disclosure.

FIG. 4 shows a substrate with six Horizontal Hall elements arranged on a virtual circle, spaced apart by multiples of 60°, as may be used in embodiments of the present disclosure.

Figure 5:
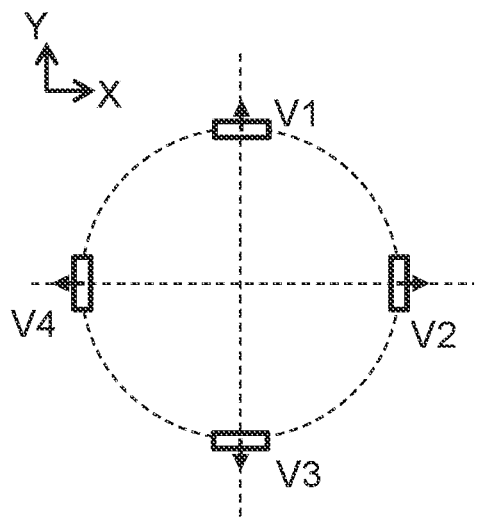
FIG. 5 shows a substrate with four Vertical Hall elements arranged on a virtual circle, spaced apart by multiples of 90°, and oriented with their axis of maximum sensitivity in a radial direction, as may be used in embodiments of the present disclosure.

The drawings are only schematic and are non-limiting. In the drawings, the size of some of the elements may be exaggerated and not drawn on scale for illustrative purposes.

In the various figures, equivalent elements with respect to their function are usually provided with the same reference numerals/signs modulo 100, so that these elements are usually described only once.

DETAILED DESCRIPTION OF ILLUSTRATIVE EMBODIMENTS

The present disclosure will be described with respect to particular embodiments and with reference to certain drawings but the disclosed embodiments are not limited thereto but only by the claims.

It is to be noted that the individual features listed in the description below can be combined in any technically meaningful way with each other (also across different categories, e.g. apparatus and method) and show further embodiments of the present disclosure. The description of the disclosed embodiments are additionally characterized and specified particularly in connection with the figures.

Furthermore, it is to be understood that the term "and/or" or the expressions "at least one of" or "one or more of", if used herein in order to combine a first and a second feature, are to be construed as disclosing a first embodiment that comprises only the first feature, a second embodiment that comprises only the second feature, and a third embodiment that comprises both the first feature and the second feature. If more than two features are listed, also any combinations thereof are to be construed as disclosed embodiments according to the present disclosure.

Still further, the term "approximately" or "essentially" or "substantially" indicates a range of tolerance which the skilled person in the field in question considers to be normal. In particular, the term "approximately" or "essentially" or "substantially" is to be understood as a tolerance range of the referred quantity of up to a maximum of +/−20%, preferably up to a maximum of +/−10%.

In this document, the term "sensor" or "magnetic sensor" can refer to a component or a group of components or a sub-circuit or a structure capable of measuring a magnetic quantity, such as for example a magneto-resistive element, a GMR element, an XMR element, a horizontal Hall plate, a vertical Hall plate, a Wheatstone-bridge containing at least one magneto-resistive element, or an inductive transducer (e.g. receiving coils of an inductive magnetic sensor), etc.

Embodiments of the present disclosure are typically described using an orthogonal coordinate system which is fixed to the sensor device, and having three axes X, Y, Z, where the X and Y axis are parallel to the substrate (e.g. semiconductor substrate), and the Z-axis is perpendicular to the substrate.

In this document, horizontal Hall plates are typically referred to by H1, H2, etc., signals obtained from these horizontal Hall plates are typically referred to by h1, h2, etc., Vertical Hall plates are typically referred to by V1, V2, etc., and signals from these vertical Hall plates are typically referred to by v1, v2, etc.

The present disclosure is related to magnetic position sensor systems, in particular linear or angular position sensor systems comprising a magnetic source and a magnetic position sensor device. The magnetic source may e.g. be a two-pole disk magnet, or a two-pole ring magnet, or a two-pole bar magnet, or an elongated or a circular magnetic structure comprising a plurality of alternating poles. The present disclosure is also related to such a magnetic position sensor device itself. It is noted however, that the disclosed embodiments will also work with a magnet having at least four poles, or at least six poles, etc.

Referring to the Figures.

FIG. 1 and FIG. 2 show a few illustrative examples of angular position sensor systems in which the techniques proposed by the present disclosure can be applied, but the present disclosed embodiments are not limited thereto, and the techniques described further can e.g. also be applied in linear position sensor systems (not explicitly shown). Such a linear position sensor system may comprise e.g. a two pole bar magnet, or an elongated magnetic structure comprising at least four alternating magnetic poles. The present disclosure is also related to a magnetic sensor device configured for determining the orientation of a substantially uniform magnetic field (e.g. the Earth magnetic field), as may be used in an electronic compass (eCompass), or a magnetic field generated by at least one coil.

FIG. 1 is a schematic representation of an angular position sensor system 100 comprising a magnet 101 and a sensor device 102. The magnet 101 is rotatable about a rotation axis. The sensor device 102 is arranged "on axis".

FIG. 2 is a schematic representation showing in a single drawing two angular position sensor systems in which the sensor device is arranged "off axis". A first angular position sensor system comprises the magnet 201 and the sensor device 202a arranged under the magnet. A second angular position sensor system comprises the magnet 201 and the sensor device 202b arranged next to the magnet (sometimes also referred to as "on the equator", or "in a satellite position").

FIG. 3 to FIG. 8 show a few illustrative examples of sensor arrangements which may be used in embodiments of the present disclosure, but the disclosed embodiments are not limited thereto and may also use other sensor arrangements.

FIG. 3 shows a substrate with four Horizontal Hall elements H1 to H4 arranged on a virtual circle, spaced apart by multiples of 90°. The substrate is not explicitly shown. The horizontal Hall elements may be incorporated in, or mounted on said substrate. In preferred embodiments of the present disclosure, the substrate is a silicon substrate, and the sensors are embedded therein. This also applies for FIG. 4 to FIG. 8.

FIG. 4 shows a substrate with six Horizontal Hall elements H1 to H6 arranged on a virtual circle, spaced apart by multiples of 60°.

While not explicitly shown, it is also possible to use a substrate having eight Horizontal Hall elements arranged on a virtual circle, and spaced apart by multiples of 45°, but substrates with more than eight Horizontal Hall elements are also possible, e.g. 10 Hall elements spaced apart by multiples of 36°, or 12 Hall elements, spaced apart by multiples of 30°.

FIG. 5 shows a substrate with four Vertical Hall elements V1 to V4 arranged on a virtual circle, spaced apart by multiples of 90°, and oriented with their axis of maximum sensitivity in a radial direction.

Figure 6:
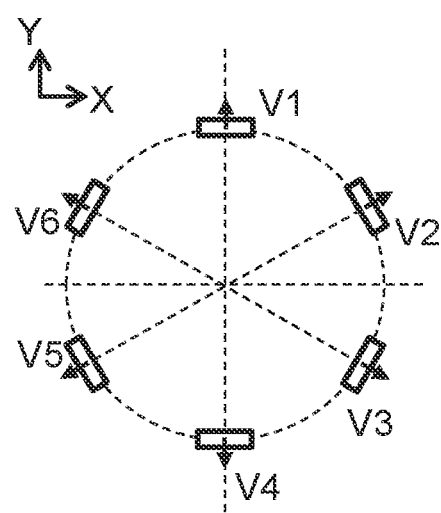
FIG. 6 shows a substrate with six Vertical Hall elements arranged on a virtual circle, spaced apart by multiples of 60°, and oriented with their axis of maximum sensitivity in a radial direction, as may be used in embodiments of the present disclosure.

FIG. 6 shows a substrate with six Vertical Hall elements V1 to V6 arranged on a virtual circle, spaced apart by multiples of 60°, and oriented with their axis of maximum sensitivity in a radial direction.

While not explicitly shown, it is also possible to use a substrate having eight Vertical Hall elements arranged on a virtual circle, and spaced apart by multiples of 45°, and oriented with their axis of maximum sensitivity in a radial direction, but substrates with more than eight Vertical Hall elements are also possible, e.g. 10 Hall elements spaced apart by multiples of 36°, or 12 Hall elements spaced apart by multiples of 30°.

Figure 7:
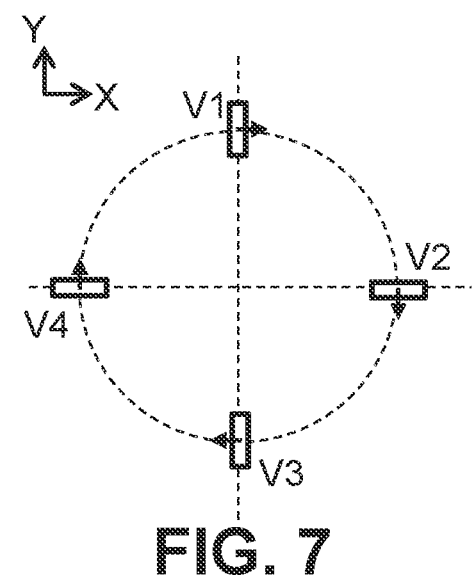
FIG. 7 shows a substrate with four Vertical Hall elements arranged on a virtual circle, spaced apart by multiples of 90°, and oriented with their axis of maximum sensitivity in a circumferential direction, as may be used in embodiments of the present disclosure.

FIG. 7 shows a substrate with four Vertical Hall elements V1 to V4 arranged on a virtual circle, spaced apart by multiples of 90°, and oriented with their axis of maximum sensitivity in a circumferential direction, i.e. tangential to the virtual circle.

Figure 8:
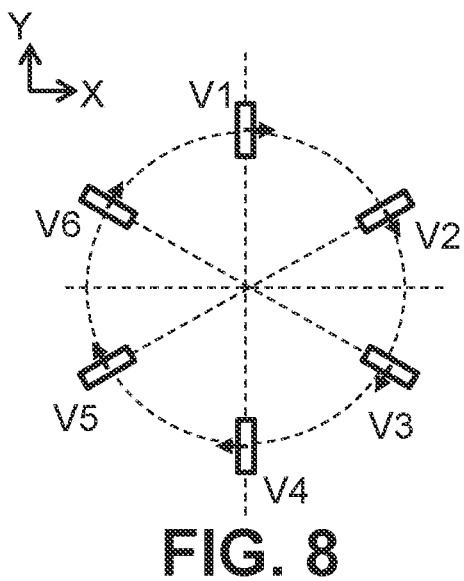
FIG. 8 shows a substrate with six Vertical Hall elements arranged on a virtual circle, spaced apart by multiples of 60°, and oriented with their axis of maximum sensitivity in a circumferential direction, as may be used in embodiments of the present disclosure.

FIG. 8 shows a substrate with six Vertical Hall elements V1 to V6 arranged on a virtual circle, spaced apart by multiples of 60°, and oriented with their axis of maximum sensitivity in a circumferential direction.

While not explicitly shown, it is also possible to use a substrate having eight Vertical Hall elements arranged on a virtual circle, and spaced apart by multiples of 45°, and oriented with their axis of maximum sensitivity in a circumferential direction, but substrates with more than eight Vertical Hall elements are also possible, e.g. 10 Hall elements spaced apart by multiples of 36°, or 12 Hall elements spaced apart by multiples of 30°.

In the examples shown in FIG. 3 to FIG. 8, the sensors are arranged on a virtual circle and are equidistantly spaced, and while this is preferred, it is not absolutely required for the present embodiments to work. Indeed, the present embodiments will also work with if the sensors are not equidistantly spaced. In fact, the sensors do not need to be arranged on a single circle either, and the disclosed embodiments will also work if the sensors are arranged on two virtual circles, or are arranged at the crossings of a regular grid, or are pseudo-randomly placed.

In the examples shown in FIG. 3 to FIG. 8, the sensors are horizontal Hall elements, or vertical Hall elements, but the present disclosure is not limited thereto, and will also work with other sensor technologies, for example magneto-resistive elements such as xMR, TMR, AMR, GMR or inductive sensors.

It is noted that the principles of the present embodiments will also work with a sensor arrangement comprising only two sensors, e.g. in a variant of FIG. 3 that comprises only two horizontal Hall elements H1 and H2, or in a variant of FIG. 5 comprising only two vertical Hall elements V1 and V2 with their axis of maximum sensitivity oriented in a radial direction, or in a variant of FIG. 7 comprising only two vertical Hall elements V1 and V2 with their axis of maximum sensitivity oriented in a circumferential direction.

As will be understood further, it is advantageous however to use more than two sensors, e.g. four sensors, or five sensors, or six sensors, or seven sensors, or eight sensors, because the technique used in embodiments of the present disclosure is capable of exploiting the redundancy to increase the accuracy, and can also be used for error detection.

The present embodiments will be further described using the sensor arrangement of FIG. 3 to keep the description simple, but as already mentioned above, the present disclosure is not limited thereto. The present embodiments can be considered as an alternative or an improvement of the devices and systems described in patent document U.S. Pat. No. 8,963,540(B2), which is incorporated herein by reference in its entirety. A reading of this document may be helpful to better understand and appreciate the present embodiments.

Figure 9:
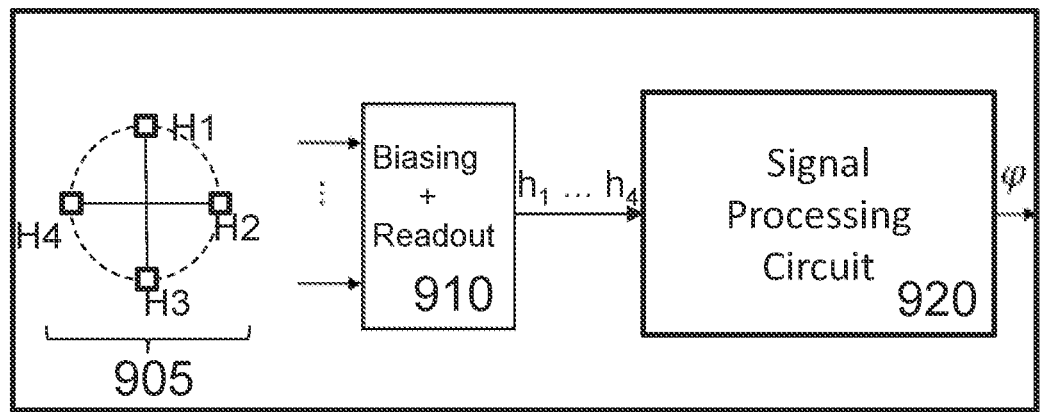
FIG. 9 to FIG. 11 show high-level block-diagrams of sensor devices according to the embodiments.

FIG. 9 shows a high-level block-diagram of a sensor device 902 as proposed by the disclosed embodiments. The sensor device 902 comprises a sensor arrangement 905, a "biasing and readout circuit" 910, and a signal processing circuit 920.

As already mentioned above, several sensor arrangements can be used, e.g. any of the examples shown in FIG. 3 to FIG. 8, but other sensor arrangements comprising at least two sensors oriented in different directions can also be used.

"Biasing and readout" circuits are well known in the art, but are not the main focus of the present embodiments, and hence need not be described in more detail here. It suffices to say that Hall elements and a Wheatstone bridge comprising one or more magneto resistive elements are electrical devices with two "excitation nodes" and two "output nodes". They can be biased by applying a known voltage or a known current to the "excitation nodes", and the sensor signal can be obtained as a differential voltage signal over the "output nodes". The biasing and readout circuit 910 will typically also comprise an amplifier (not explicitly shown) for amplifying the sensor signals. For ease of the description, it will be assumed that the output of the amplifier is a "single-ended" voltage signal (i.e. referenced to ground).

The "signal processing circuit" 920 is the main contribution of the present embodiment over the prior art, and will be described in more detail further. Importantly, most of the signal processing in the sensor device 902 is performed in the analog domain, using time-continuous signals. This offers the advantage that the processing can be very fast, without requiring a fast digital signal processor (DSP), that an analog-to-digital convertor (DAC) is not absolutely required, and that quantization errors can be avoided.

Figure 10:
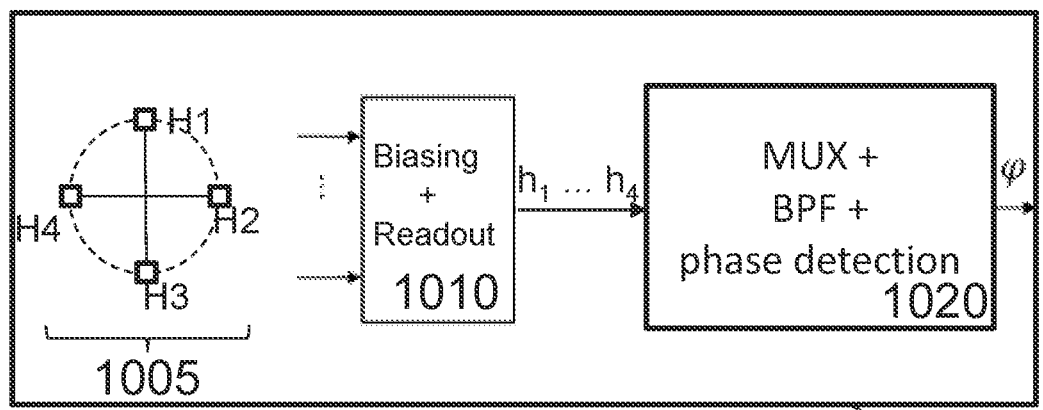

FIG. 9 is a generic block-diagram. FIG. 10 shows a special case of FIG. 9, wherein the Signal Processing Circuit 1020 comprises a Multiplexer (e.g. an analog N-to-1 multiplexer), and a Band Pass Filter, and a Phase detector. A more detailed example will be discussed in FIG. 12.

Figure 11:
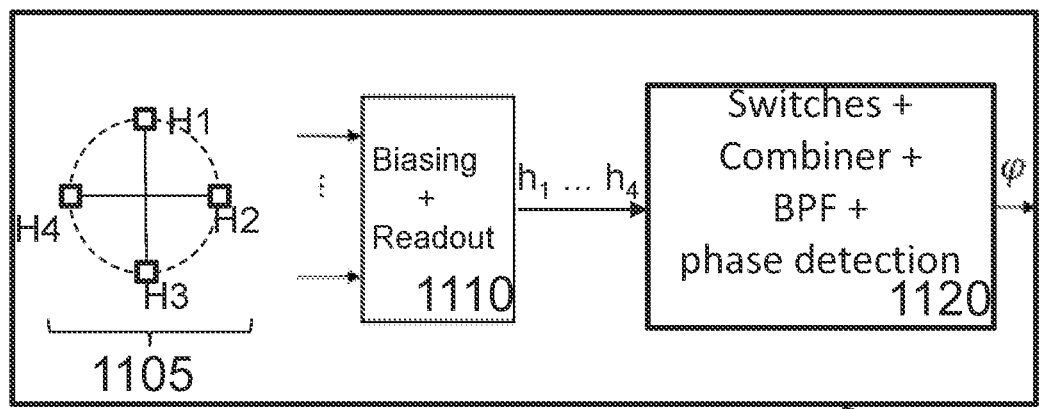

FIG. 11 shows another special case of FIG. 9, wherein the Signal Processing Circuit 1120 comprises a plurality of switches, a signal combiner (e.g. for adding or subtracting signals), and a Band Pass Filter, and a Phase detector. More detailed examples will be discussed in FIG. 13 and FIG. 14.

Figure 12:
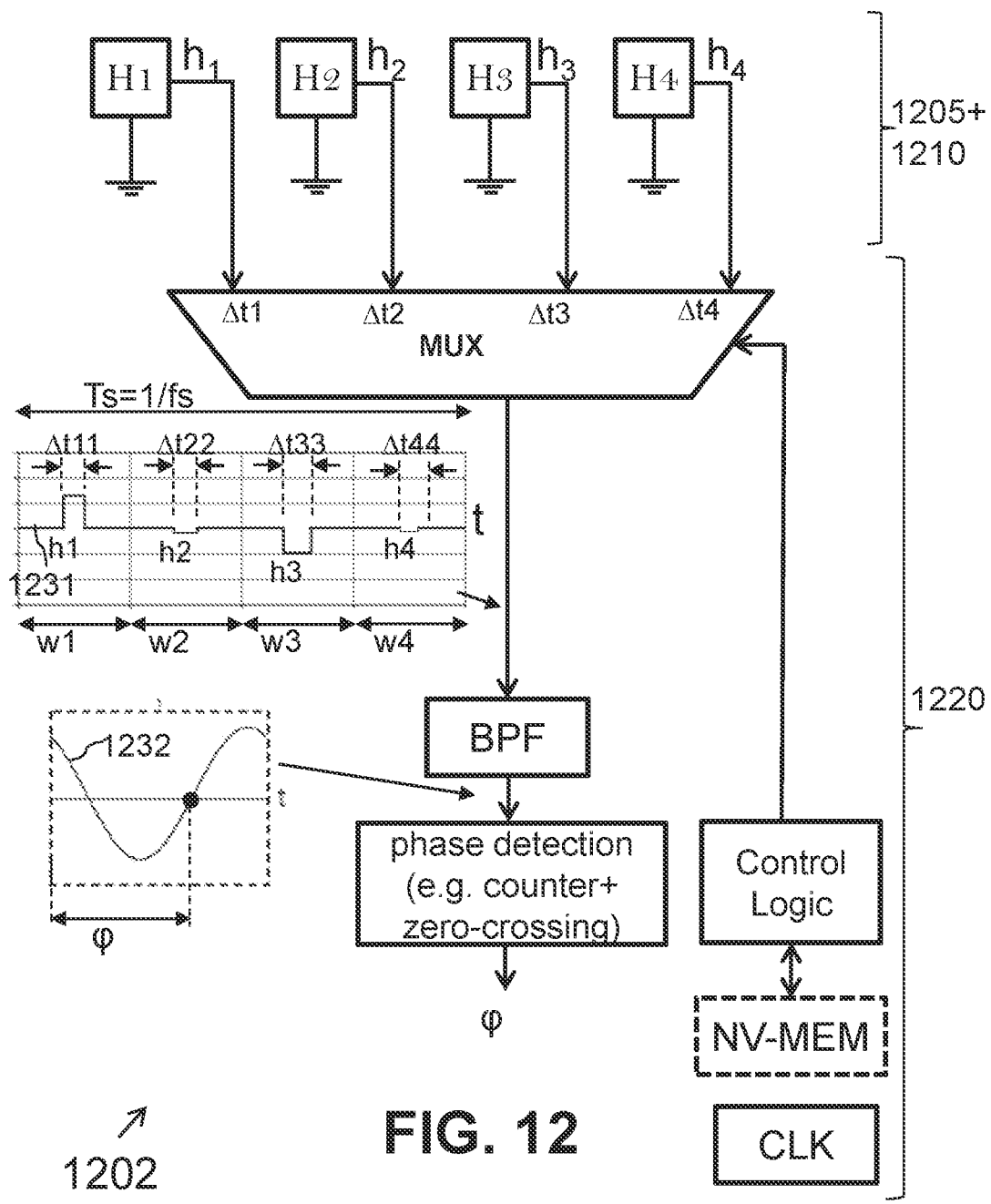
FIG. 12 to FIG. 14 show more detailed schematic block diagrams of sensor devices according to the embodiments.

FIG. 12 shows a schematic block-diagram of a sensor device proposed by the present disclosed embodiments. The sensor device 1202 comprises a "sensor arrangement" 1205, a "biasing and readout circuit" (not explicitly shown), and a signal processing circuit 1220.

In the example shown in FIG. 12, the sensor arrangement 1205 comprises four horizontal Hall sensors H1 to H4 organized as illustrated in FIG. 3. Ideally, if the four sensors H1 to H4 are arranged on a virtual circle, and have exactly the same layout, and are spaced apart by multiples of 90°, and if they are brought in the vicinity of a two-pole magnet (e.g. as illustrated in FIG. 1 or FIG. 2), the four signals can be described as sinusoidal signals which are 90° phase shifted relative to each other.

In practice, however, the four sensors H1 to H4 typically have a sensitivity mismatch (or gain mismatch), i.e. that the amplitudes of the four signals are not the same, and optionally also have an offset, i.e. that the output of the sensor element is not zero, even in the absence of a magnetic field. Such imperfections can be measured during a calibration test of the device, e.g. in a test-environment where a known magnetic field is applied. The result of such a measurement may for example yield the values listed in the following table:

TABLE 1 example of Gain and Offset mismatch

|  | H1 | H2 | H3 | H4 |
|---|---|---|---|---|
| Offset (V) | −0.017 | 0.044 | −0.100 | −0.040 |
| Gain | 1.034 | 1.000 | 1.059 | 1.159 |

In the prior art, gain and offset mismatches are typically "addressed" by laser trimming, but that is not absolutely required in the present disclosed embodiments. The signals h1, h2, h3, h4 obtained from the sensors may thus have slightly different gains, and/or non-zero offsets.

The signal processing circuit 1220 comprises a multiplexer MUX, in the example a 4-to-1 analog multiplexer, acting as a signal combiner configured for combining portions of the sensor signals h1, h2, h3, h4 into a single combined waveform.

More specifically, the multiplexer MUX is configured for generating a waveform according to a timing scheme having a predefined duration Ts (e.g. having a value of about 4 µs), partitioned in a number of timing windows w1, w2, w3, w4, each having a duration of Ts/4, in case there are four sensors which are equidistantly spaced, thus, in the example, each window has a duration of about 1 is.

Other values of the predefined duration Ts may also be used, for example 1/fs, wherein fs=20 kHz, or fs=40 kHz, or fs=80 kHz, or fs=200 kHz, or fs=400 kHz, or fs=800 kHz.

The multiplexer MUX is configured to include a portion of the first sensor signal h1 during a first predefined time duration $\Delta t11$ in the first time window w1, and to include a portion of the second sensor signal h2 during a second predefined time duration $\Delta t22$ in the second time window w2, and to include a portion of the third sensor signal h3 during a third predefined time duration $\Delta t33$ in the third time window w3, and to include a portion of the fourth sensor signal h4 during a fourth predefined time duration $\Delta t44$ in the fourth time window w4. Preferably, the portions are centrally aligned in the respective time windows w1 to w4, to reduce or avoid jitter.

The processing circuit 1220 further comprises a band pass filter BPF configured for mainly passing the basic harmonic of the waveform generated by the multiplexer MUX, and for rejecting higher harmonics. Band-Pass filters are well known in the art, and hence need not be described in more detail here.

The output of the bandpass filter is provided to a phase detector, configured for detecting the phase $\phi$ of the signal. The phase detector may be identical to the one described in U.S. Pat. No. 8,963,540(B2), but the present disclosed embodiments not limited thereto and other suitable phase detectors may also be used. The phase detection may be based on the detection of a zero crossing of the bandpass filtered signal. The moment of the zero-crossing may be measured using a counter.

The main difference between the circuit of FIG. 12 of the present embodiment and the circuit described in U.S. Pat. No. 8,963,540(B2), is that, rather than completely filling the first time window w1 with the first sensor signal h1, and completely filling the second time window w2 with the second sensor signal h2, etc., in the disclosed embodiments, the time windows w1 to w4 are only partially filled with sensor signals. More specifically, in the first time window w1 only a portion of h1 is used over a predefined time period $\Delta t11$, and in the second time window w only a portion of h2 is used over a second predefined time period $\Delta t22$, etc. Typically the values of $\Delta t11$, $\Delta t22$, $\Delta t33$ and $\Delta t44$ are four different values, although some of the values may coincidently be equal. The values of the time periods $\Delta t11$, $\Delta t22$, $\Delta t33$, $\Delta t44$ are preferably determined during a calibration procedure, aimed at maximizing the overall accuracy, or minimizing the overall error.

Without going into the details here, it can be simply stated that the values of the predefined time durations $\Delta t11$, $\Delta t22$, $\Delta t33$, $\Delta t44$ are chosen such that the resulting phase or angle $\phi$ has a good accuracy, despite the above mentioned gain mismatches and non-zero offsets.

As a rule of thumb, (and also as an initial set of values during the calibration procedure), the time periods $\Delta t11$, $\Delta t22$, $\Delta t33$, $\Delta t44$ may be chosen inversely proportional to the respective gains of the sensors H1 to H4. During the calibration procedure, more suitable time periods may be found, as will be described further. Indeed, the "best values" may also compensate for some non-idealities of the magnetic source, such as e.g. material defects, mounting offset, tilt, etc.

In practice, at least two of the values $\Delta t11$, $\Delta t22$, $\Delta t33$, $\Delta t44$ are different from each other, but more often, all of these values are different from each other. It is noted that not the absolute value of the time durations is important, but the relative time durations. In an embodiment, the absolute values of $\Delta t11$, $\Delta t22$, $\Delta t33$, $\Delta t44$ may be chosen to be values of about 30% to 70% of the duration of the time windows w1 to w4.

The processing circuit 1220 may further comprise a clock circuit, which is typically connected to an (external) crystal oscillator.

The processing circuit 1220 may further comprise control logic for generating a control signal for operating the multiplexer in accordance with the timing scheme with the predefined time durations $\Delta t11$, $\Delta t22$, $\Delta t33$, $\Delta t44$.

The predefined timing durations $\Delta t11$, $\Delta t22$, $\Delta t33$, $\Delta t44$ may be stored in a non-volatile memory (e.g. flash) of the sensor device during the calibration procedure, and may be retrieved from the non-volatile memory during actual use of the sensor device, e.g. by a control logic block, but other solutions are possible. It may for example also be possible to implement the processing circuit using programmable hardware in which the predefined timing durations are hardcoded.

It is noted that the graph showing the illustrative combined waveform 1231, is a realistic example for a magnetic source positioned at an angle close to 0°, because the amplitude of h1 is close to "+1", the amplitude of h2 is close to "0", the amplitude of h3 is close to "−1", and the amplitude of h4 is close to "0", (in relative terms). If the magnetic source would be positioned or oriented at a 90° angle, the amplitude of h1 would be close to "0", the amplitude of h2 would be close to "+1", the amplitude of h3 would be close to "0", and the amplitude of h4 would be close to "−1", etc. Such other graphs are not included in the application.

For completeness it is noticed that the graph with the bandpass-filtered signal 1232 shown in FIG. 12 does not really correspond with the graph showing the combined waveform 1231, and should in fact be shifted approximately 200° to the left, but the reader will appreciate that the graph of the bandpass-filtered signal shown in FIG. 12 nicely illustrates how the zero-crossing needs to be determined.

As mentioned above, the phase $\phi$ can be measured using an incremental counter. The counter value, indicative of the angle or phase $\phi$ to be measured, may for example be output as a digital value on an output port of the sensor device, or as a serial value, or as an analog value.

In a variant of the sensor device 1202 (not shown), in which the sensor arrangement 1205 would comprise for example five sensors H1 to H5, the sample period Ts would be divided in five time windows w1 to w5, each having a duration of Ts/5, and each of these five time windows w1 to w5 would be partially filled with one of the sensor signals h1 to h5, more specifically, over a respective time period $\Delta t11$ to $\Delta t55$, the values of which may be determined during a calibration procedure.

Figure 13:
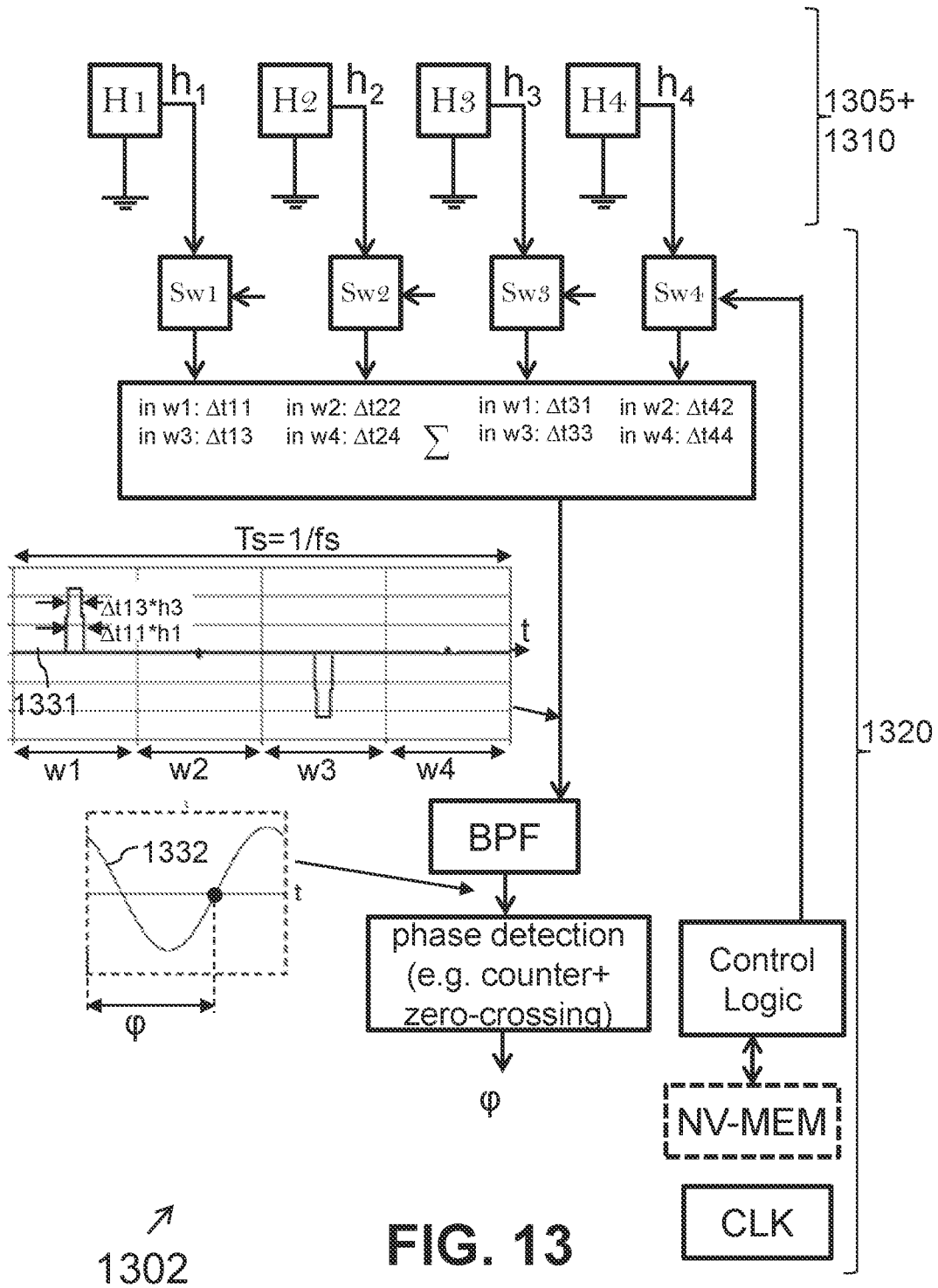

FIG. 13 shows a schematic block diagram of a sensor device 1302 which can be seen as a variant of the sensor device 1202 of FIG. 12, the main difference being that the multiplexer MUX of FIG. 12 is replaced by a plurality of switches and a signal combiner $\Sigma$ configured for adding or subtracting two portions of sensor signals in each timing window w1, w2, w3, w4. It is noted that subtracting two signals having substantially the same amplitude but opposite sign, almost doubles the signal amplitude.

More specifically, in the example shown in FIG. 13:
 a portion $\Delta t11$ of the first sensor signal h1 and a portion $\Delta t13$ of the third sensor signal are added or subtracted in the first time window w1,
 a portion $\Delta t22$ of the second sensor signal h2 and a portion $\Delta t24$ of the fourth sensor signal h4 are added or subtracted in the second time window w2, (this is not very well visible in FIG. 13 because in the example shown, the amplitude of h2 and h4 are close to zero);
 a portion $\Delta t31$ of the first sensor signal h1 and a portion $\Delta t33$ of the third sensor signal h3 are added or subtracted in the third time window w3, and
 a portion $\Delta t42$ of the fourth sensor signal h4 and a portion $\Delta t44$ of the fourth sensor signal h4 are added or subtracted in the fourth time window w4. (again, this is not very well visible in FIG. 13 because in the example shown, the amplitude of h2 and h4 are close to zero)

As can be appreciated from FIG. 3, the sensors S1 and S3 are located diametrically opposite each other, as well as the sensors S2 and S4.

As a rule of thumb, (and also as an initial set of values during the calibration procedure), the time periods $\Delta t11$ and $\Delta t13$ may be chosen inversely proportional to the gain of sensor H1, and the time periods $\Delta t22$ and $\Delta t24$ may be chosen inversely proportional to the gain of sensor H2, and the time periods $\Delta t31$ and $\Delta t33$ may be chosen inversely proportional to the gain of sensor H3, and the time periods $\Delta t42$ and $\Delta t44$ may be chosen inversely proportional to the gain of sensor H4, but this set of predefined values may not yield the best possible result, as will be explained further. Indeed, the "best values" may also compensate for some non-idealities of the magnetic source such as e.g. material defects, mounting offset, tilt, etc.

It is an advantage that the position or orientation φ provided by the sensor device 1302 of FIG. 13 is less sensitive to an external disturbance field.

Everything else described above for the sensor device of FIG. 12 is also applicable here, mutatis mutandis.

Figure 14:
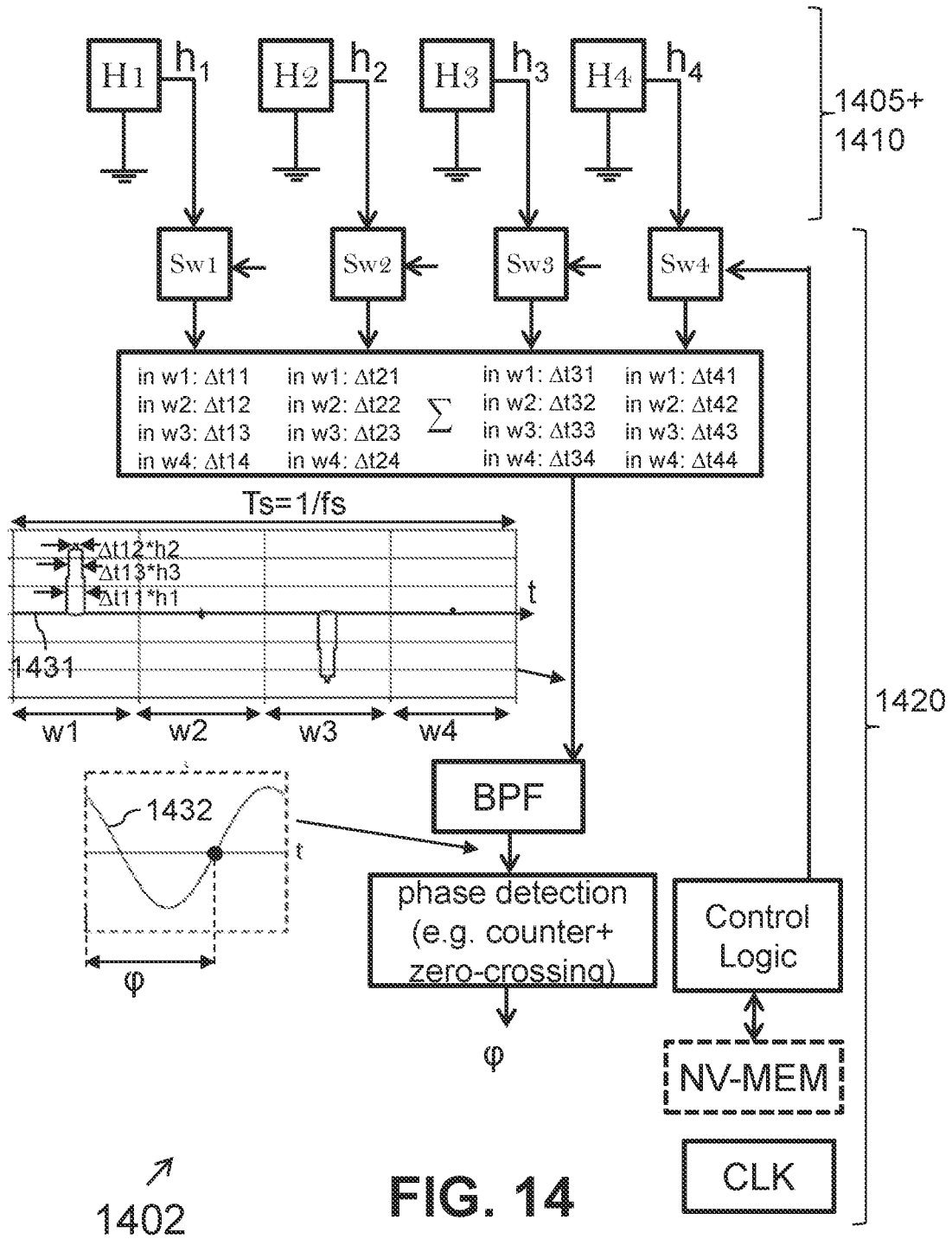

FIG. 14 shows a schematic block diagram of a sensor device 1402 which can be seen as a variant of the sensor device 1302 of FIG. 13, and thus as a further variant of the sensor device 1202 of FIG. 12.

The main difference between the sensor device 1402 of FIG. 14 and the sensor device 1302 of FIG. 13 is that the signal combiner Σ is configured for adding or subtracting more than two, e.g. four portions of sensor signals in each timing window w1, w2, w3, w4, for example three sensor signals, or four sensor signals.

More specifically, in the example shown in FIG. 14, the portions which are added or subtracted in the first time window w1 can be written as: sum1=a11*h1+a12*h2+a13*h3+a14*h4, wherein all, a12, a13, a14 can be positive or negative coefficients, and wherein the signal combiner Σ adds signal portions if the sign of the coefficient is positive, and subtracts signal portions if the sign of the coefficient is negative. The portion of h1 is a time-fraction over a time period Δt11 equal to or proportional to the absolute value of the coefficient all. Or stated in mathematical terms, Δt11=abs(a11). Likewise, Δt12=abs(a12), Δt13=abs(a13) and Δt14=abs(a14).

Likewise, the signal generated in the second time window w2 can written as: sum2=a21*h1+a22*h2+a23*h3+a24*h4; the signal generated in the third time window w3 can written as: sum3=a31*h1+a32*h2+a33*h3+a34*h4; and the signal generated in the fourth time window w4 can written as: sum4=a41*h1+a42*h2+a43*h3+a44*h4.

The skilled reader would expect that the values of the coefficients a12, a14, a21, a23, a32, a34, a41 and a43 are equal to zero, but the inventors found that the coefficients all to a44 can actually be used not only to calculate an linear or angular position or orientation of the magnetic field, but can also be used to improve the accuracy (or reduce the error) related to non-idealities of the sensor arrangement and/or of the magnetic source. It can also be stated that the signals h1 to h4 contain position information and redundancy information (because there are more than two sensors), but in classical solutions, there is no way to extract or use the redundant information present in the signals to improve the signal accuracy. The technique proposed by the present disclosure does allow to use the redundant information to reduce the overall error. This is an important advantage of the present disclosed embodiments. It will be appreciated that, in general, the higher the number of sensors, the more coefficients can be used to improve the overall accuracy.

Everything else described above for the embodiment of FIG. 13 is also applicable here, mutatis mutandis.

Calibration Procedure:

While finding optimal values for the coefficients all to a44 of FIG. 14, and/or for the time durations Δt11, Δt22, Δt33, Δt44 of FIG. 12, and/or for the time durations Δt11, Δt13, Δt22, Δt44, Δt31, Δt33, Δt42, Δt44 of FIG. 13, is not essential to understand the working principles of the present embodiments, the following section provides a possible way to find optimal or sub-optimal values.

Given the hardware of FIG. 12 to FIG. 14 with the timing scheme, the task of finding the time durations or coefficients can be considered as an optimization procedure to find a "global optimum" or a "local optimum" in a multi-dimensional space. As already mentioned before, there is probably only one "overall best solution", but there are probably multiple sub-optimal solutions, which, when used in a sensor device or a sensor system proposed by the present disclosure, may not result in the lowest possible error, but may still be able to achieve an error reduction of at least a factor 2.0 as compared to a solution in which the entire window w1 is filled with signal h1, the entire window t2 is filled with signal h2, etc. (without trimming). It is explicitly pointed out that the present disclosed embodiments are not only aimed at the single best solution that uses the best set of coefficients or time periods, but is also directed to sub-optimal solutions, as long as they provide at least a factor of 2.0 error reduction.

Looking back to FIG. 12 (with 4 sensors), it can be appreciated that there are only 4 coefficients to be optimized, or in general, if the sensor arrangement has N sensors, there are N coefficients to be optimized. In FIG. 13, there are 2*N coefficients to be optimized, and in FIG. 14 there are up to N*N coefficients to be optimized.

From these examples, it shall be clear that the number of coefficients or time periods to be optimized depends on the number of sensors (N), and depends on how many signals the hardware is capable of adding or subtracting in a single time window. The latter may depend on the hardware implementation, e.g. on how many adders or subtractors are present in the combiner circuit Σ. This is a designers choice.

In order to also handle defects or non-idealities of the magnetic source, such as tilt, mounting offset, etc., the calibration procedure has to be performed in an arrangement that includes the magnetic source and the sensor device that will be used in combination in the final product. Indeed, the optimal values are typically different for each individual sensor and magnet.

Once a sensor arrangement is chosen (e.g. having four horizontal Hall elements as shown in FIG. 3), and the number of coefficients to be optimized is chosen (a value in the range from N to N*N), the following algorithm may be used to find a "local minimum" for an angular position sensor system:

a) provide a hardware setup comprising a magnetic source and a sensor device (e.g. the sensor device of FIG. 12 or FIG. 13 or FIG. 14), and connect the magnetic source with an accurate reference angle sensor device (e.g. using an optical encoder mounted to the same shaft), which can be used to determine the actual mechanical position of the magnetic source;

b) choose an initial set of coefficients values;

c) apply this set of coefficient values, position the magnetic source in various positions, e.g. over a full stroke of 360°, in steps of for example 5°; determine in each step the angular position φ provided by the sensor device, and calculate the difference (i.e. error) between the actual (mechanical) position and the position provided by the sensor device, and store the largest error or the worst case error as "the" error for this set of coefficient values;

d) modify one of the coefficients (e.g. by increasing or decreasing), and repeat step c) for the modified set of coefficients, and store "the worst case error" for this modified set of coefficients;

e) repeat step d) for each of the coefficients, starting from the initial set of coefficients, and determine which modification provides the best improvement; then consider the initial set of coefficients with this one modified coefficient that gives the best improvement as the new "initial set" of coefficients.

f) repeat steps c) to e) a predefined number of times (e.g. at most 100 times, or at most 250 times), or until the resulting error is smaller than a predefined threshold (e.g. smaller than 5°, or smaller than 4°, or smaller than 3°, or smaller than 2°).

Or stated in other words, this algorithm starts from an initial set of coefficients values, and stepwise improves the coefficients set by modifying one coefficients at the time, namely the coefficients which (when increased or decreased with a certain value, e.g. ±0.05) provides the highest improvement. It is pointed out that such a gradual improvement approach may not always find the "global optimum", but typically finds a "local optimum" in the coefficient space.

Many variants of this algorithm are possible. For example, one could perform the algorithm described above first in a coarse manner, by moving the magnetic source in steps of e.g. 60°, and by modifying a coefficient in steps of ±0.05, and when a close-to-optimum solution for the set of coefficients is found, to then repeat the algorithm with a smaller angular rotation (e.g. in steps of 30°) and/or a smaller coefficient step (e.g. ±0.02).

It will be appreciated that describing the most efficient algorithm to find "the" optimum set of parameters falls out of the scope of the present disclosure, but that the algorithm described above is sufficient to enable the disclosed embodiments.

While the disclosed embodiments have been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure, and the appended claims. In the claims, the word "comprising" does not exclude other elements or steps, and the indefinite article "a" or "an" does not exclude a plurality of elements or steps. The mere fact that certain measures are recited in different dependent claims does not indicate that a combination of these measures cannot be used to advantage.

Any reference signs in the claims should not be construed as limiting the scope thereof.

What is claimed is:

1. A sensor device for determining a position of a magnetic source that is movable relative to the sensor device, or vice versa, or for determining an orientation of a substantially uniform magnetic field, the sensor device comprising:
    a substrate comprising a plurality of at least two magnetic sensors configured to provide a plurality of at least two sensor signals;
    a signal combiner configured to combine sensor signals into a combined waveform; and,
    a processing circuit configured to extract said position or orientation from the combined waveform;
    wherein
    the signal combiner is configured to generate the combined waveform, according to a timing scheme corresponding to an arrangement of the sensors, by including at least one portion of the sensor signals during respective predefined time durations;
    wherein the predefined time durations correspond to the arrangement of the sensors, and are determined during a calibration procedure; and
    wherein at least two of said predefined time durations have a different value.

2. The sensor device according to claim 1, wherein the processing circuit comprises a Band-Pass-Filter and a phase detector.

3. The sensor device according to claim 1, wherein the signal combiner is configured to generate said combined waveform according to a timing scheme having a predefined duration Ts, partitioned in a number of timing windows each having a duration of Ts/N, N being the number of magnetic sensors.

4. The sensor device according to claim 3, wherein the signal combiner is configured to include only one portion of the sensor signals in each respective timing window.

5. The sensor device according to claim 3,
    wherein the number of magnetic sensors is an even number; and
    wherein the magnetic sensors are equidistantly spaced on a virtual circle;
    and wherein the signal combiner is configured to add or subtract portions of two diametrically opposite magnetic sensors in each timing window.

6. The sensor device according to claim 3,
    wherein the signal combiner is configured to add or to subtract portions of at least two or at least three or at least four sensor signals in each timing window.

7. The sensor device according to claim 6,
    wherein the signal combiner is configured to add or subtract a portion of each sensor signal in each timing window, each portion having a predefined time duration.

8. The sensor device according to claim 6,
    wherein the time durations of at least two portions or at least three portions being added or subtracted, have values which are different from each other.

9. The sensor device according to claim 1,
    wherein the magnetic source is a permanent magnet which rotates about a rotation axis;
    and wherein the position to be determined is an angular position.

10. The sensor device according to claim 1,
    wherein the magnetic source is an elongated structure having one pole pair, or having a plurality of alternating poles;
    and wherein the sensor device is movable relative to a magnetic structure at a constant distance;
    and wherein the position to be determined is a linear position along the elongated structure.

11. The sensor device according to claim 1,
    wherein the substantially uniform magnetic field is an earth magnetic field, or is a magnetic field generated by at least one coil;
    and wherein the orientation to be determined is an angle with respect to a reference orientation.

12. The sensor device according to claim 1,
    wherein some or all magnetic sensors are configured to measure a magnetic field in a direction perpendicular to the substrate; or
    wherein some or all magnetic sensors are configured to measure a magnetic field in a direction parallel to the substrate; or
    wherein a first subset of the magnetic sensors is configured to measure a magnetic field in a direction perpendicular to the substrate, and a second subset of the magnetic sensors are configured to measure a magnetic field in a direction parallel to the substrate; or wherein some or all magnetic sensors are configured to measure a magnetic field in a radial direction parallel to the substrate; or wherein some or all magnetic sensors are configured to measure a magnetic field in a circumferential direction parallel to the substrate.

13. The sensor device according to claim 1, wherein the magnetic sensors are configured to measure a magnetic field in at least two different orientations.

14. The sensor device according to claim 1, wherein sensor elements are situated on a virtual circle.

15. The sensor device according to claim 14, wherein sensor elements are equidistantly spaced apart.

16. A position sensor system comprising:
a magnetic source;
a sensor device, wherein the sensor device comprises:
  a substrate comprising a plurality of at least two magnetic sensors configured to provide a plurality of at least two sensor signals;
  a signal combiner (MUX, Σ) configured to combine sensor signals (h1, h2, h3, h4) into a combined waveform (1231; 1331; 1431); and,
  a processing circuit configured to extract a position of the magnetic source or an orientation of a magnetic field from the combined waveform (1231; 1331; 1431);
wherein
  the signal combiner (MUX, Σ) is configured to generate the combined waveform (1231; 1331; 1431), according to a timing scheme corresponding to an arrangement of the sensors, by including at least one portion of the sensor signals (h1, h2, h3, h4) during respective predefined time durations (Δt11 to Δt44);
  wherein the predefined time durations (Δt11 to Δt44) correspond to the arrangement of the sensors, and are determined during a calibration procedure; and
  wherein at least two of said predefined time durations (Δt11 to Δt44) have a different value.

17. The position sensor system according to claim 16, wherein the predefined time durations are determined during a calibration procedure which is performed using a test-setup comprising the sensor device and the magnetic source.

* * * * *